(## United States Patent
Gullion

[15] 3,653,020
[45] Mar. 28, 1972

[54] CURRENT MONITOR FOR THRESHOLD DETECTION

[72] Inventor: Billy B. Gullion, Reistertown, Md.

[73] Assignee: The United States of America as represented by the Secretary of the Navy

[22] Filed: Aug. 6, 1970

[21] Appl. No.: 61,525

[52] U.S. Cl.................................340/253 P, 340/410
[51] Int. Cl.......................................G08b 21/00
[58] Field of Search..............340/253, 255 A, 214, 410, 421, 340/248; 73/167; 324/51

[56] References Cited

UNITED STATES PATENTS 3,281,697  10/1966  Hansen et al. .................325/151

Primary Examiner—John W. Caldwell
Assistant Examiner—Daniel Myer
Attorney—R. S. Sciascia and Thomas O. Watson, Jr.

[57] ABSTRACT

A device for monitoring the current supplied to a missile and its firing mechanism which gives a GO-NO-GO indication during flight line checkout and thereby an alert to any existing malfunctions. A Schmitt trigger fires a monostable multivibrator which activates a current amplifier to trigger a power transistor with 5.9 ohms of load resistance connected to the emitter thereof. This load resistance simulates the actual missile firing mechanism. The current developed through the load resistance is applied to a current sensor that triggers a driver and relay. If the current is of sufficient magnitude, the relay is energized and a green lamp will illuminate indicating a "GO" condition. If insufficient current is applied to the device, the relay will not energize and a red lamp will illuminate indicating a "NO-GO" condition.

9 Claims, 3 Drawing Figures

INVENTOR.
BILLY B. GULLION
BY *Thomas O. Watson Jr.*

ATTORNEY

CURRENT MONITOR FOR THRESHOLD DETECTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to improvements in test circuitry, and more particularly it pertains to a new and improved device for monitoring the current applied to a missile and its firing mechanism.

Those concerned with the development of missile firing circuitry for aircraft have long recognized the need for a reliable and accurate device that will checkout and test the circuitry and alert operating personnel to any existing malfunctions in order to prevent sending the aircraft into combat with a faulty missile firing circuit that could have disastrous results. Such hazards as moisture in the aircraft wiring, bad solder joints, switch resistance, faulty wiring, etc., can cause an increase in line resistance that will reduce the current applied to the missile firing mechanism. If this happens, when the "missile fire" switch in the cockpit is energized, the reduced current will cause a delay in activating the missile squibb which will result in the pilot "overshooting" the target before the missile is released.

For obvious reasons, it is impossible to check the aircraft circuitry with the actual missile installed. Also, the full current of at least 4.0 amperes must be drawn through the circuitry for the actual time duration or any reduction due to moisture may not be detected.

In the past, several devices have been employed in order to perform a comprehensive test of aircraft wiring during flight line testing. One device utilized standard test equipment for the Continuity Test. This device has not been satisfactory as it is impossible to apply the necessary current to the circuitry to locate any current reduction due to moisture and "cold" solder joints. Another device which has been used is to connect the correct load resistance in place of the missile and its firing mechanism and pass the current through a circuit breaker that is 200–300 percent overloaded. The time duration of the pulse length before the breaker "trips" is monitored on an oscilloscope. The time of the pulse length is then correlated with a calibration curve of each circuit breaker used. However, this method necessitates transporting an additional piece of commercial equipment to the flight line that requires an AC power source. In addition, each circuit breaker used must have a separate calibration curve plotted and, after using them for a period of time, they cannot be depended upon to "trip" at the same time period for the exact same current pulse. Therefore this device has also been unsatisfactory.

OBJECTS OF THE INVENTION

Accordingly, it is an object of the present invention to provide a simple and compact device that is accurate and reliable to checkout and test missile firing circuitry for aircraft.

Another object is to eliminate the need for additional equipment and calibration curves and to provide a simple GO-NO-GO indication for flight line checkout.

Other objects, advantages and novel features of the invention will become apparent from the following detailed description of the invention when considered in conjunction with the accompanying drawings.

SUMMARY OF THE INVENTION

The general purpose of this invention is to provide a checkout and test of missile firing circuitry for aircraft. The device to simulate the missile and its firing mechanism is connected in place of the actual missile and its firing mechanism and is calibrated to draw 4.0 amperes when 27 volts DC is supplied by the cockpit missile firing switch. The first stage of the invention is composed of a delay circuit of approximately 100 milliseconds to allow all other stages to stabilize before circuit activation. The second stage is a Schmitt trigger that fires a monostable multivibrator developing a positive pulse for 50 milliseconds. This stage activates a current amplifier that triggers a power transistor with 5.9 ohms of load resistance connected to the emitter thereof. This load simulates the actual missile firing mechanism. The current developed through the load resistance is applied to a current sensor that triggers a driver and relay. If the current is of sufficient magnitude (4.0 amperes), the driver fires, the relay is energized and a green lamp will illuminate indicating a "GO" condition. The driver transistor is biased so that if the current is less than 4.0 amperes, the relay will not energize and a red lamp will illuminate indicating a "NO GO" condition. A final stage is composed of a delay circuit which prevents either lamp (GO or NO GO) from illuminating until the cycle is completed. Overall accuracy is within 5 percent. Also, the device of the present invention is equipped with a probe that connects to the aircraft circuitry at the missile location.

DETAILED DESCRIPTION OF THE PREFERRED EMBODIMENT

Figure 1:
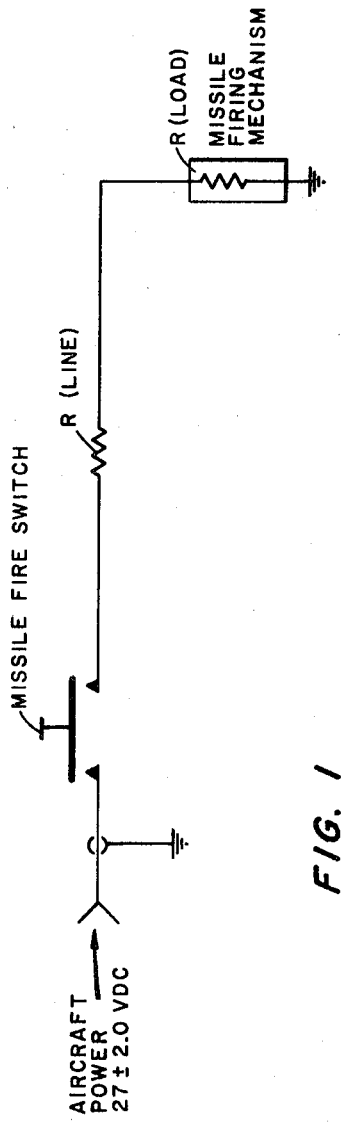
FIG. 1 shows the basic aircraft missile firing circuitry simplified for analytical purposes.

FIG. 1, which is a simplified circuit to illustrate the principle of the invention, shows the aircraft power source of 27±2.0 volts DC which is supplied by the actual pulse from the cockpit missile firing switch. The entire cycle to be described is activated by depressing the "missile fire" switch located in the cockpit of the aircraft. The switch is momentarily held for 2 to 3 seconds, then released. $R_{LINE}$ represents the line resistance that will reduce the current applied to the missile firing mechanism and consists of such things as moisture in the aircraft wiring, bad solder joints, switch resistance, faulty wiring, etc. $R_{LOAD}$ is the load resistance and simulates the actual missile firing mechanism. The actual aircraft parameters for this current are:

$R_{LINE}$ = 0.43±0.07 ohms.
$R_{LOAD}$ = 5.9±0.10 ohms.
Time duration = 45 to 50 milliseconds.

Figure 2:
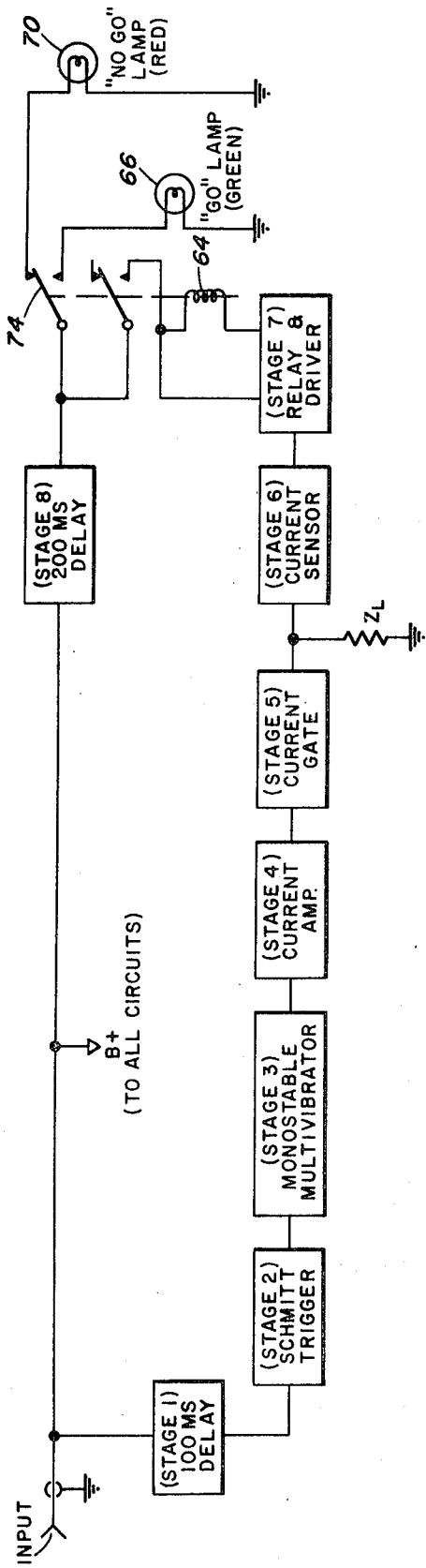
FIG. 2 illustrates the overall circuitry of the present invention in block diagram form.

The device to simulate the missile and its firing mechanism is shown in the block diagram of FIG. 2. The input represents the power supplied when the missile firing switch in the cockpit is depressed. The first stage is composed of a delay circuit of approximately 100 milliseconds to allow all other stages to stabilize before circuit activation. Stage 2 is a basic Schmitt trigger that fires the one shot multivibrator of stage 3 developing a positive pulse for 50 milliseconds. The third stage activates the driver or current amplifier of stage 4 which triggers the current gate of stage 5. Stage 5 is composed of a power transistor with 5.9 ohms of load resistance connected to the emitter thereof. This load resistance $Z_L$ simulates the actual missile firing mechanism. The current developed through the load resistance $Z_L$ (5.9 ohms) is applied to the biasing network or current sensor of stage 6 which triggers the driver and relay of stage 7. If the current is of sufficient magnitude (4.0 amperes), the driver of stage 7 fires, the relay is energized and a green lamp will illuminate indicating a "GO" condition. The driver transistor of stage 7 is biased so that if the current in stage 5 is less than 4.0 amperes, the relay will not energize and a red lamp will illuminate indicating a "NO GO" condition. Stage 8 is composed of a delay circuit that prevents either lamp (GO or NO GO) from illuminating until the cycle is completed. Overall accuracy is within 5 percent. In addition, the device is equipped with a probe (not shown) that connects to the aircraft circuitry at the missile location.

Figure 3:
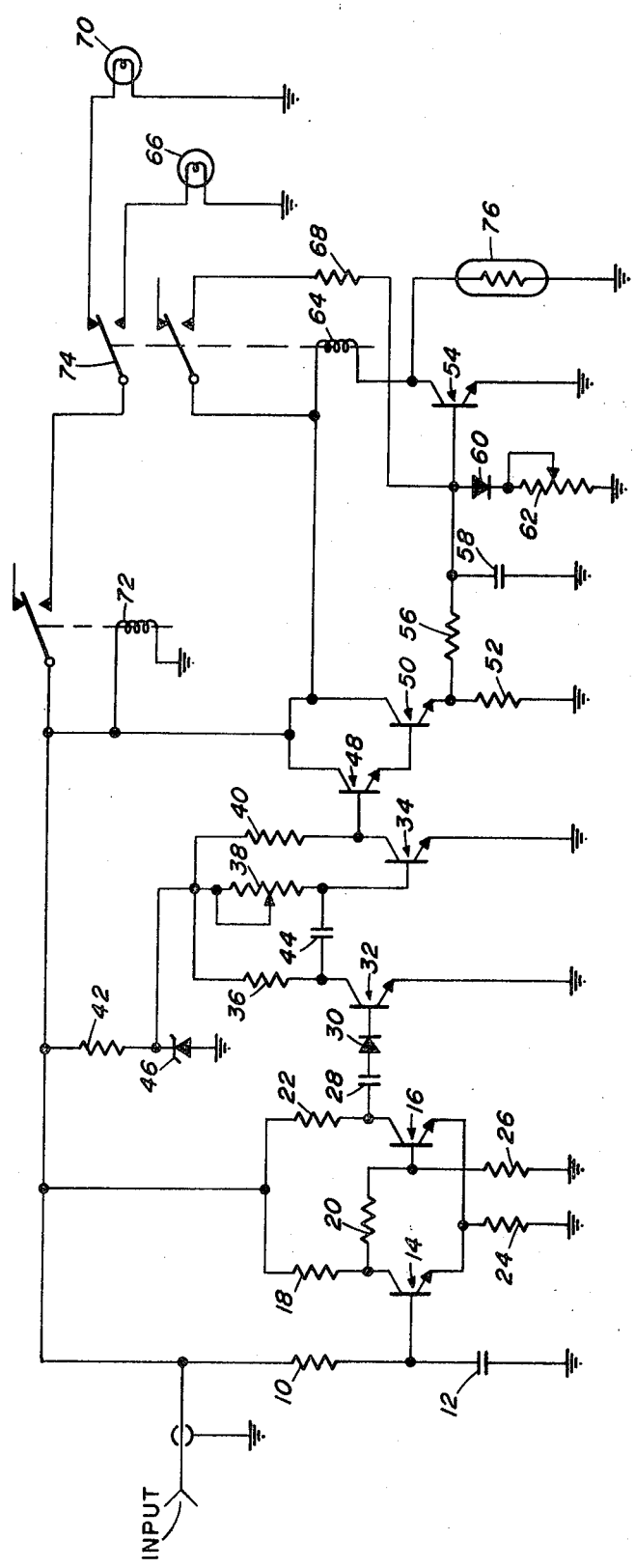
FIG. 3 shows a schematic wiring diagram in accordance with the present invention.

Referring to the schematic diagram of FIG. 3, each stage of the invention will now be described in detail. Stage 1 is composed of a 1,000 ohm resistor 10 and a 100 microfarad capacitor 12. This network delays the trigger input for 100±10 milliseconds which is necessary to allow the other circuitry to stabilize and to prevent erratic firing of the current gate of stage 5 at the moment of "turn-on." Stage 2 is a basic Schmitt trigger that develops the firing pulse for stage 3. It is composed of transistors 14 and 16 and the necessary components to develop a positive current pulse which consists of resistors 18, 20, 22, 24 and 26, capacitor 28 and a diode 30. Stage 3 is monostable (one shot) multivibrator with an adjustable time delay and is composed of transistors 32 and 34, resistors 36, 38, 40 and 42, capacitor 44 and Zener diode 46. It is calibrated by adjusting resistor 38 for a positive output pulse of 50 milliseconds. Zener diode 46 (18 volts), in conjunction with resistor 42, limits the voltage applied to this stage. This is necessary to prevent the positive current pulse from varying in time duration due to the variation in aircraft voltage. The output of this stage fires transistor 48. Stage 4 is a current amplifier which consists of transistor 48 that drives transistor 50 into hard conduction. Stage 5 is the current gate that is composed of power transistor 50 and the necessary load resistor 52 ($Z_L$), to develop the current pulse of 4 amperes. The maximum current is triggered for a time duration of 50 milliseconds as stated above. The current developed through load resistor 52 is applied to stage 6.

Stage 6 is the current sensor or biasing network for transistor 54 and is composed of resistor 56, capacitor 58, diode 60 and potentiometer 62. Potentiometer 62 is calibrated to fire transistor 54 if the current pulse developed through load resistor 52 is 4.0 amperes or more in amplitude. If the current pulse is 3.8 amperes, or less, transistor 54 will not fire. Diode 60 is added to help compensate for drift in the firing point of transistor 54 due to temperature change. Stage 7 is composed of transistor 54 and relay 64. The firing point of transistor 54 is biased as stated above. When transistor 54 fires, relay 64 is energized and a "GO" lamp 66 (green) illuminates. When relay 64 energizes, current is applied through resistor 68 to the base of transistor 54 to maintain this condition until power is removed from the entire circuitry. If transistor 54 does not fire, relay 64 remains in the normal condition and the "NO GO" lamp 70 (red) illuminates. Stage 8 is composed of a time delay relay 72 with a delay factor of 200±10 milliseconds. The purpose of this stage is to prevent voltage from being applied to the wiper 74 of relay 64 until the cycle is completed. This prevents erratic blinking of either lamp 66 or 70.

The basic circuitry described above can also be used to check and test the "eject-jettison" circuit in the aircraft. The only changes to the circuit would be the value of load resistor 52 from 5.9 ohms to 1.9 ohms and to modify the input connection to mate with the aircraft circuit.

Obviously many other modification and variations of the present invention are possible in the light of the above teachings. For example, one modification of the basic design could include a self-contained power source that would keep the circuitry in the ready condition at all times. However, for the present application it is unnecessary as it will prevent impacting the existing configuration. Another possible variation is a thermistor 76 for temperature compensation, which could be connected to the collector of transistor 54 as shown in FIG. 3.

What is claimed is:

1. A current monitor for threshold detection of a missile and its firing mechanism, which comprises:
   means for producing a current pulse;
   a current amplifier activated by said current pulse;
   a power transistor triggered by said current amplifier;
   means connected to said power transistor for simulating the missile firing mechanism;
   a current sensor to detect the current pulse developed through said simulation means and fire a transistor at a predetermined current threshold;
   means for indicating if said current threshold is reached.

2. A current monitor for threshold detection of a missile and its firing mechanism as recited in claim 1, wherein a delay network to provide circuit stabilization is connected to said current pulse producing means.

3. A current monitor for threshold detection of a missile and its firing mechanism as recited in claim 2, wherein said current pulse producing means comprises a Schmitt trigger and a monostable multivibrator.

4. A current monitor for threshold detection of a missile and its firing mechanism as recited in claim 3, wherein said simulation means comprises a load resistor connected to the emitter of said power transistor.

5. A current monitor for threshold detection of a missile and its firing mechanism as recited in claim 4, wherein a relay is energized when said transistor fires at the predetermined current threshold.

6. A current monitor for threshold detection of a missile and its firing mechanism as recited in claim 5, wherein said indicating means comprises a lamp which is illuminated when said current threshold is reached and said relay is energized.

7. A current monitor for threshold detection of a missile and its firing mechanism as recited in claim 1, wherein said simulation means comprises a load resistor connected to the emitter of said power transistor.

8. A current monitor for threshold detection of a missile and its firing mechanism as recited in claim 7, wherein said load resistor has a valve of 5.9 ohms.

9. A current monitor for threshold detection of a missile and its firing mechanism as recited in claim 8, wherein the current threshold is 4.0 amperes.

* * * * *